Oct. 21, 1958 W. AVERIN 2,856,685
B-X CUTTER
Filed May 24, 1957 3 Sheets-Sheet 1
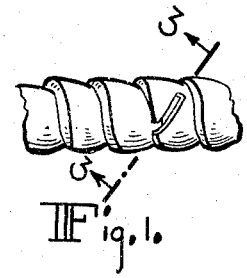
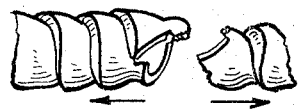
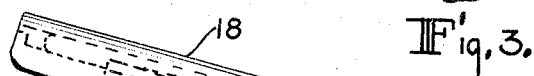
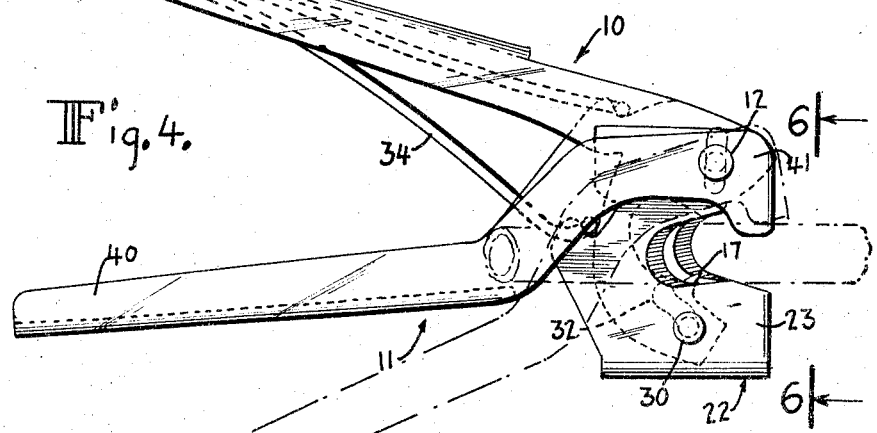
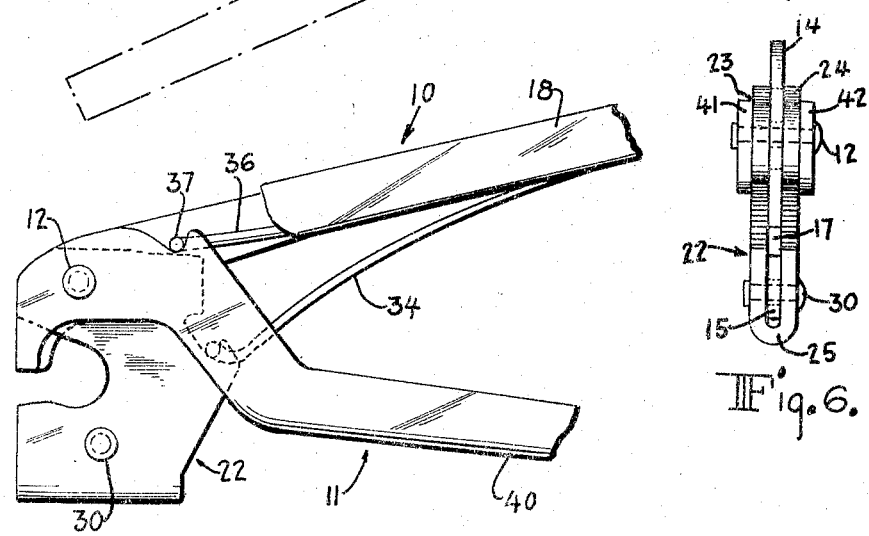
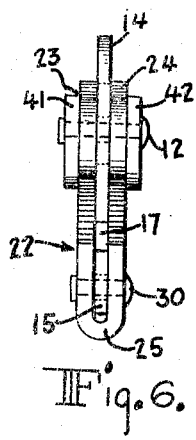
INVENTOR
Walter Averin
BY
Pennie, Edmonds, Morton, Barrows & Taylor
ATTORNEYS Oct. 21, 1958 W. AVERIN 2,856,685
B-X CUTTER
Filed May 24, 1957 3 Sheets-Sheet 2
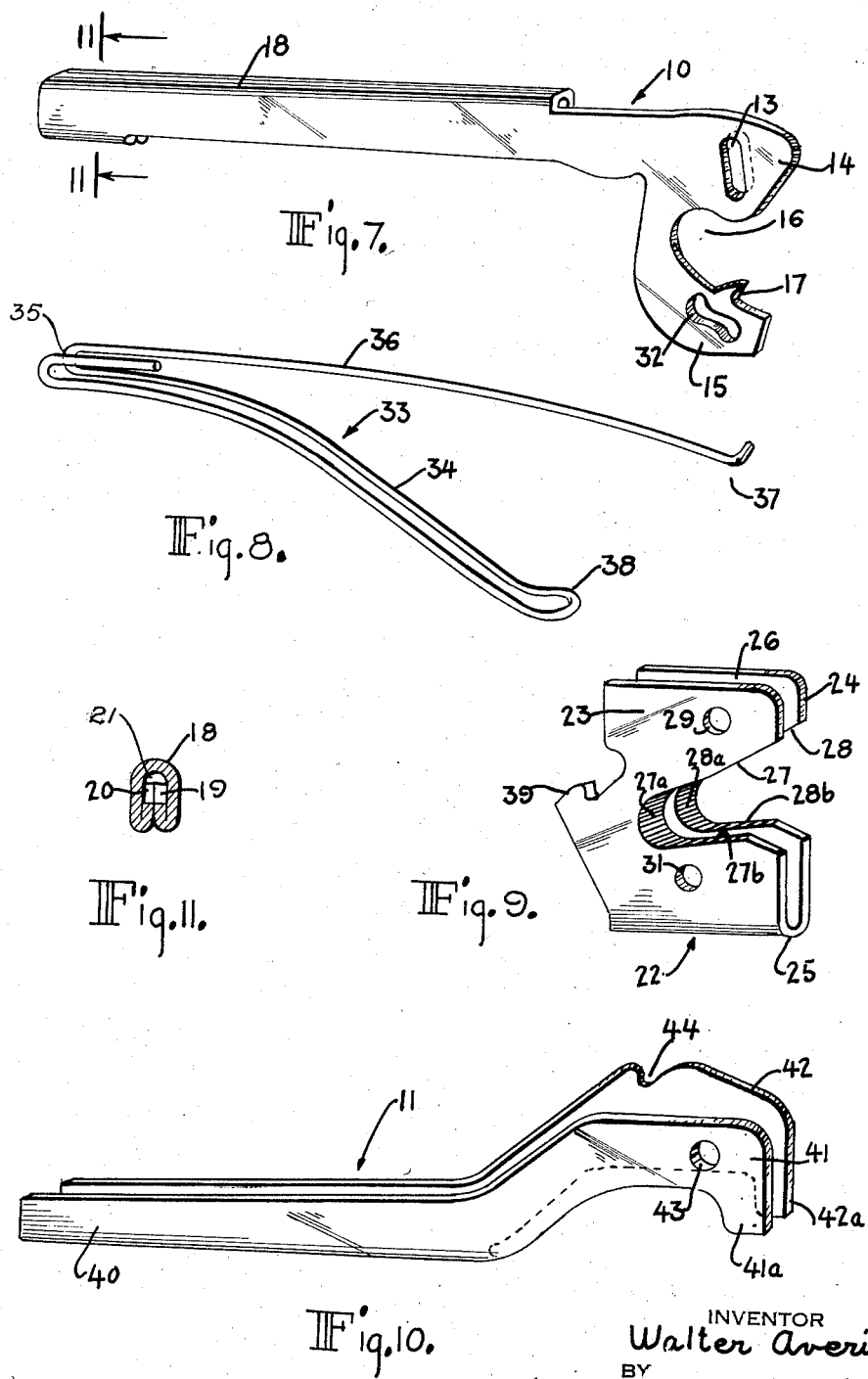

Oct. 21, 1958
W. AVERIN
2,856,685
B-X CUTTER
Filed May 24, 1957
3 Sheets-Sheet 3
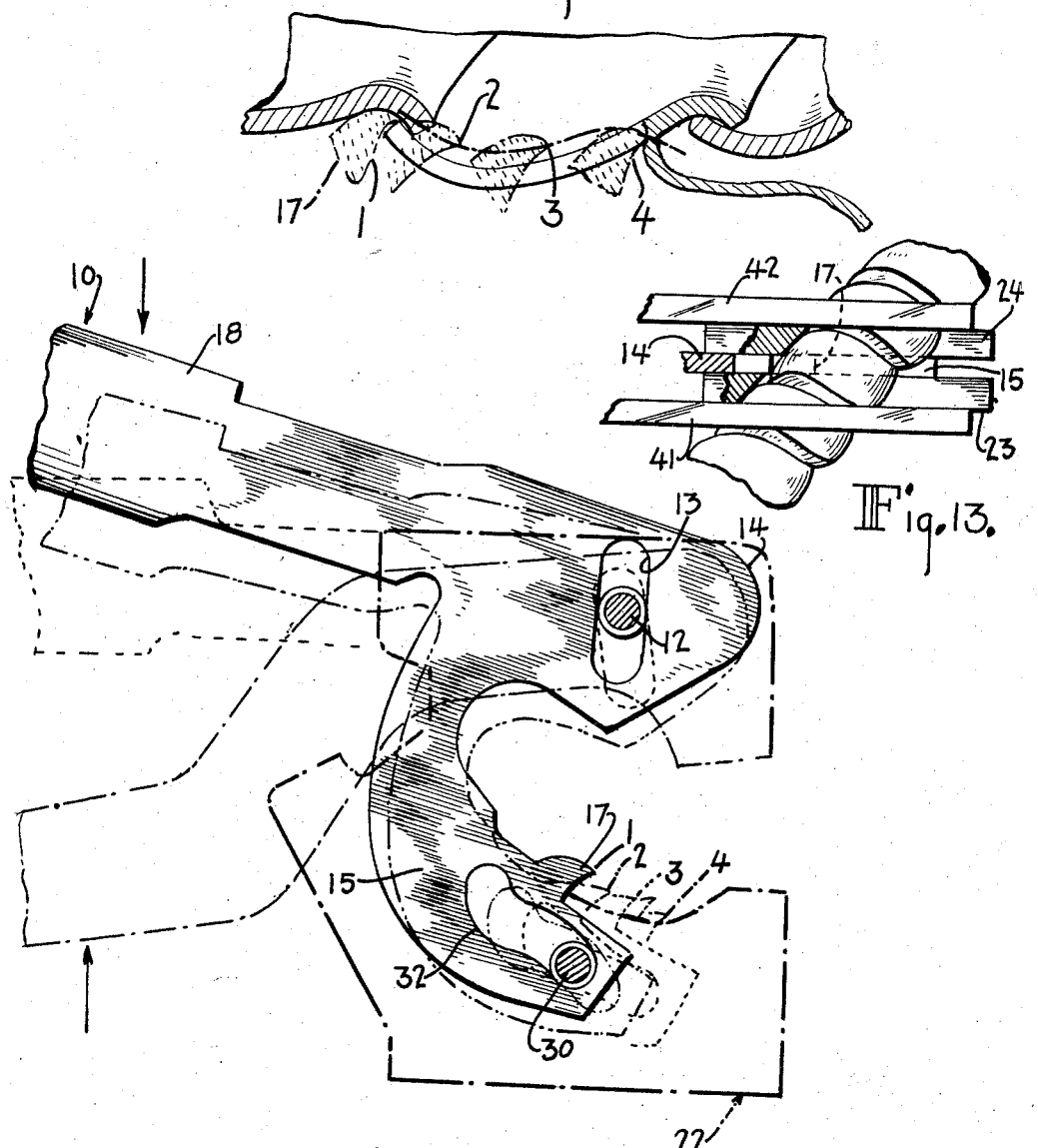
INVENTOR
Walter Averin
BY
ATTORNEYS United States Patent Office 2,856,685
Patented Oct. 21, 1958

2,856,685

B-X CUTTER

Walter Averin, Esopus, N. Y.

Application May 24, 1957, Serial No. 661,405

18 Claims. (Cl. 30—91)

The present invention relates to cutting apparatus, and more particularly to a novel and improved device for cutting armored electrical cable, commonly known as B-X cable, and the like.

A common form of electrical cable, known as B-X cable, is comprised of one or more insulated electrical conductors housed within a flexible metal protective casing formed of spirally wound, inter-engaging convolutions of a single strip of metal. Conventionally, the metal strip of material, which forms the protective casing, is of more or less S-shaped cross-section, and is wound so that the leading edge of each convolution of the spiral is overlapped by the trailing edge of the next successively wound convolution. The leading edges of the convolutions project somewhat in an outward direction, while the trailing edges of the convolutions project inwardly. The arrangement is such that the leading and trailing edges of successively wound convolutions are interlockingly engaged to form a continuous tubular casing for the electrical conductors. The metal material used to form the casing is usually a soft iron material, having a substantial measure of flexibility, and the interlocking engagement of the successive convolutions is such as to permit limited relative movement between such successive convolutions. Thus, the tubular casing has substantial flexibility and may readily be bent around corners, etc., while at the same time protecting the electrical conductors from exposure.

Heretofore, the installation of B-X cable has involved substantial problems in connection with the cutting of the cable for installation at terminals, junctions, etc. As will be readily understood, the cable ends must be cut in a manner such that a substantial length of conductor is exposed beyond the end of the metal casing. This requires that the tubular casing be severed without cutting or damaging the insulated conductors housed therein, an operation which has been difficult of accomplishment heretofore.

In accordance with the present invention, an improved tool or device is provided which grips the metal casing of the cable and severs or substantially severs a convolution thereof without entering into the interior of the casing to an extent such that the insulated conductors therein will be damaged or will be likely to be damaged. To this end, the new cutting tool incorporates a cutting element which is projected a short distance underneath the exposed trailing edge of one convolution of the cable and is caused to travel in a direction generally transversely of the convolution and in a path corresponding to the cross-sectional shape of the metal strip. The arrangement is such that the convolution is severed or substantially severed and may be readily broken away by hand, while at the same time the insulated conductors within the casing remain undamaged.

In the past, various tools have been proposed for cutting B-X cable and the like by causing a cutting element to be projected just inside the casing and moving the element through a distance sufficient to sever the cable. However, such prior devices have disadvantages in that the cutting action is complicated and inefficient, and, of perhaps greater importance, a number of manual manipulations of the tool or device is required to effect the cutting operation. Accordingly, it is one of the important features of the present invention to provide a hand operated cutting tool for B-X cables and the like which, in a single motion or operation, and in an improved and highly efficient manner completes the desired cutting operation. In this respect, the new device is a combined gripping and cutting device, having a pair of hand operated levers or handles, which is operative, in a single motion of the handles, to sequentially grip and sever the cable in the manner desired. The improved mode of operation is made possible, at least in part, by the improved cutting action of the device, as will appear.

Another important feature of the invention resides in the provision of an improved device for cutting B-X cable and the like with which the cutting operation may be carried out with substantial efficiency. Thus, prior cutting devices of which I am aware, are arranged to cut the cable either transversely or longitudinally of its principal axis. In either case, the required length of cut is substantially greater than necessary, requiring excessive effort on the part of the operator of the device, and complicated arrangements are usually required to hold the cable and effect the actuation of the cutting element. In accordance with one aspect of the present invention, the cutting of the cable takes place along an axis such that the length of the cut may be a relative minimum, consistent with providing simplified arrangements for holding or clamping the cable during the cutting operation. More specifically, in the illustrated form of the invention, the cutting action takes place along an axis disposed at approximately 45 degrees to the principal axis of the cable, whereby the cutting element moves more or less transversely of the convolution being severed.

Other advantageous features of the invention reside in the construction and arrangement of the individual elements of the new cutting device, whereby the complete device is highly compact and of a generally simplified design, comprising only three principal parts, and is adapted for economical manufacture and convenient use.

For a better understanding of the invention, and for a discussion of the above and other advantageous features thereof, reference should be made to the following specification and accompanying drawings, in which:

Fig. 1 is a fragmentary view of a section of B-X cable or the like, illustrating the manner in which a convolution thereof is severed with the new cutting tool;

Fig. 2 illustrates the cable section of Fig. 1 after the cable has been broken into two sections at the severed convolution;

Fig. 3 is a fragmentary cross-sectional view, taken generally along line 3—3 of Fig. 1;

Fig. 4 is an elevational view of a cable cutting device made in accordance with the invention;

Fig. 5 is a fragmentary elevational view of the device of Fig. 4, as viewed from the opposite side;

Fig. 6 is an end elevation of the device of Fig. 4;

Figs. 7–10 inclusive are perspective views of the important component elements of the new cutting device;

Fig. 11 is a cross-sectional view taken along line 11—11 of Fig. 7;

Fig. 12 is an enlarged fragmentary sectional view of a section of B-X cable or the like, illustrating the manner in which a convolution thereof is severed with the new apparatus;

Fig. 13 is an enlarged fragmentary top plan view of the cutting device of Fig. 4, illustrating the manner in which a section of cable is held thereby during a cutting operation; and Fig. 14 is an enlarged fragmentary elevational view of the cutting device of Fig. 4, indicating successive positions of the component parts thereof during a cutting operation.

Referring now to the drawings, the numerals 10, 11, designate handle members which are pivotally connected together, by means of a suitable pin 12. The member 10, shown in detail in Fig. 7, may advantageously be stamped or otherwise formed of an appropriate grade of steel and has a substantially flat forward section formed of a single thickness of material. An elongated slot 13, disposed generally transversely to the principal axis of the member 10, is located in a forwardly projecting arm portion 14 thereof, the arm portion having substantial width to accommodate the slot 13 and to provide adequate strength in the member 10.

Extending downwardly and forwardly from the arm portion 14, and in the illustrated form of the invention, forming an integral part thereof, is an arm 15, which may be referred to as the cutting arm. As shown clearly in Fig. 7, the arms 14 and 15 are spaced apart at their forward ends to define a forwardly opening U-shaped recess 16. Adjacent the free end of the cutting arm 15, and advantageously forming an integral part thereof, is a small, triangular cutting element 17 which projects into the U-shaped recess 16. The arrangement and function of the cutting element 17 forms an important aspect of the invention, to be described in greater detail.

The base portion of the handle member 10 is, in the illustrated apparatus, of U-shaped cross-section, best shown in Fig. 11, whereby to impart substantial strength to the member and to form a handle portion 18 adapted to be conveniently gripped by the hand. At the extreme base end of the handle 18, small tabs 19, 20 (Fig. 11) may be conveniently provided to substantially close the end of the handle and to form a forwardly opening recess 21 therein, the purpose of which recess will be subsequently described.

Connected to the handle member 10, by means including the pin 12, is a clamping and cutting member 22, which is advantageously formed of sheet steel material similar to that used in forming the handle member, and which is of deep, U-shaped cross section, substantially as indicated in Fig. 9. Advantageously, the clamping member 22 comprises two parallel jaw plates 23, 24 connected at the bottom by an integral portion 25 and defining an upwardly opening recess 26. The transverse width of the recess 26 is substantially equal to the thickness of the forward arm portions 14, 15 of the handle member 10, whereby the arms may be received within the recess, substantially as shown in Fig. 6.

In accordance with the invention, the jaw plates 23, 24 of the clamping member 22 have forwardly opening U-shaped recesses 27, 28, respectively, therein which are of a suitable size and shape to receive a section of B-X or similar cable of the type shown in Figs. 1–3. Also in accordance with the invention, one of the recesses, such as the recess 27, is of greater depth than the other recess, so that a section of cable fully received in the recesses 27, 28 is disposed at an acute angle with respect to the jaw plates 23, 24. Accordingly, the innermost portions of the recesses may be defined by surfaces 27a, 28a disposed at an acute angle, for example 45 degrees, with respect to the jaw plates.

In accordance with the invention, the clamping member 22 is connected to the handle member 10 at two points. Thus, the pin 12 extends through aligned openings 29 in the jaw plates and through the transversely elongated slot 13 in the arm 14. In addition, a pin 30 extends through aligned openings 31 in the lower portions of the jaw plates and through an elongated slot 32 in the arm 15. The slot 32, the function of which will be described in greater detail, is more or less S-shaped and is disposed generally at an angle with respect to the slot 13. Accordingly, when the clamping member 22 is connected to the handle member 10 by the pins 12, 30, the clamping member may be pivoted with respect to the handle member, about the axis of the pin 12, with the clamping member being caused simultaneously to shift transversely of the handle member 10 in accordance with the movement of the pin 30 through the S-shaped slot 32.

In the assembled cutting device, the clamping member 22 is normally held in a position pivoted counterclockwise with respect to the handle member 10, as viewed in Fig. 4. To this end, the device includes a spring 33 (Fig. 8), which may advantageously be formed of a length of suitable spring wire. The spring 33 includes a first arm 34, formed of a doubled length of the spring wire, which extends forwardly and downwardly from the butt or anchor end 35 of the spring. The spring is bent sharply at its anchor end 35, and a second arm 36 of the spring, formed of a single length of the wire, extends generally forward and slightly downward, having an outturned tip portion 37.

In the assembled device, as shown in Fig. 4, for example, the anchor portion 35 of the spring is inserted in the recess 21 in the base of the handle 18. The lower arm 34 of the spring projects forwardly and downwardly from the handle member 10, and the end portion 38 of the spring arm overlies projecting surface portions 39 of the jaw plates 23, 24. The arrangement is such that the spring arm 34 exerts a downward pressure against the projecting portion 39, tending to pivot the clamping member 22 counterclockwise with respect to the arm or handle member 10. Accordingly, the clamping member 22 will normally be held in a counterclockwise limit position, as determined by the permissible travel of the pin 30 in the S-shaped slot 32.

The second handle member 11 of the cutting device, shown in detail in Fig. 10, is advantageously formed of sheet steel material similar to that used in forming the handle member 10, and is bent and shaped to provide a handle 40 of U-shaped cross section and a pair of spaced clamping jaws 41, 42. The clamping jaws 41, 42, at the forward end of the handle member, are spaced apart a distance substantially equal to the total thickness of the clamping member 22, whereby the clamping member may be closely received between the jaws 41, 42, substantially as shown in Fig. 6. Aligned openings 43 are provided in the jaws 41, 42 for receiving the pin 12, whereby the handle member 11 is pivotally connected to the handle member 10 and the clamping member 22.

In accordance with one aspect of the invention, the clamping jaws 41, 42 have downwardly projecting gripping arms 41a, 42a which are of different size and configuration, whereby each of the respective gripping portions may be brought into effective contact with a section of cable disposed at an acute angle with respect to the handle member 11. Thus, the gripping portions 41a, 42a have active surface portions offset with respect to each other in a manner corresponding to the offset between surfaces 27a, 28a and disposed at an angle such that the surfaces 27a, 28a are substantially parallel to the gripping surfaces of the portions 41a, 42a.

As shown best in Fig. 10, one of the clamping jaws, i. e., jaw 42, is provided with a notch 44 along its upper edge adapted to receive the outturned end 37 of spring arm 36. Thus, in the assembled device, the spring arm 36 exerts a downward force upon the handle member 11, tending to pivot the member counterclockwise about the pin 12. It will be understood, in this respect, that the clamping member 22 and handle member 11 will pivot independently, under the action of spring arms 34 and 36 respectively, the pivoting of the clamping member being limited by the permissible travel of pin 30 in the S-shaped slot 32, while the handle member 11 may pivot through a substantially greater distance.

In the operation of the new cutting device, a section of B-X or similar cable is inserted into the open jaws of the device, the cable being disposed at an angle of approximately 45 degrees to the principal axis of the device, substantially as indicated in Fig. 13. The first closing movement of the handle members 11 and 10 brings the gripping portions 41a, 42a of the handle member 11 into a position partially closing off the recesses 27, 28 in the clamping member 22. The cable is thereby held by the members 11, 22 in position to effect a cutting operation.

The initial movement of the handle members 10, 11, to effect the clamping of a section of cable within the jaws of the device, is not accompanied by movement of the clamping member 22 relative to the handle member 10, since the handle member 11 pivots through a predetermined initial distance before the gripping portions 41a, 42a engage the cable. Accordingly, during the initial period of loading and clamping the cable, the clamping member 22 is retained by the spring arm 34 in its counterclockwise pivoted position, in which the pin 30 is at the extreme right hand end of the S-shaped slot 32.

Continued movement of the handle members 10, 11 in a closing direction, causes the gripping portions 41a, 42a to press upon the cable section and, through the latter, against the clamping member 22, so that the handle member 11 and clamping member 22 are, in effect, locked together for movement in unison with respect to the handle member 10. The cable section is thereby gripped in the cutting device. During the initial phase of the cutting operation, the cable is gripped with increased force by the action of the cutting element urging the cable against surfaces of the clamping member and, to this end, appropriate surfaces are advantageously serrated, so that the gripping action thereof is similar to that of a pipe wrench.

As the cutting operation proceeds, the pin 30, fixed to the clamping member 22, is caused to move to the left in the S-shaped slot 32, as shown in Figs. 4 and 14. There is thus effected a compound relative movement between the cutting element 17 and the cable, in that the cutting element moves into the cable and at the same time away from the central axis of the cable. In accordance with one aspect of the invention, the contours of the slot 32 are such that, after a predetermined closing movement of the handle members 10, 11, wherein one of the relative movements of the cutting element 17 is away from the central axis of the cable, the pin 30 is caused to move away from the cutting element 17, which, in effect, causes the cutting element to be projected further into the cable receiving recess of the clamping jaws. Still further continued movement of the handle in a closing direction causes the pin 30 to move into the left hand end portion of the S-shaped slot 32, at which time the pin 30 has a component of movement toward the cutting element 17, the pin 30 carrying with it the clamping member 22, whereby, in effect, the cutting element 17 is retracted from the cable receiving recess, and hence away from the cable held therein.

Thus, in the operation of the new cutting device, the cutting element 17 is caused to move, with respect to a cable clamped in the jaws of the device, through a path substantially corresponding to the irregular contour of the cable. This is illustrated schematically in Fig. 12, wherein the cutting element 17 is illustrated in successive positions, numbered 1-4 inclusive, which the element assumes with respect to the cable during a cutting operation. The successive positions 1-4 of Fig. 12 correspond substantially to the successive positions 1-4 indicated in Fig. 14, so that the relative movement between the pin 30 and the slot 32 may be readily correlated with the relative movements of the cutting element 17 and the cable. Thus, in Fig. 12, in position number 1, the cutting element 17 is in position to engage the exposed trailing edge of one convolution of the cable. The initial movement of the cutting element from position 1 to position 2 is such that the tip of the cutting element is projected under the convolution of the cable, and caused to move in a direction following the contour of the cable. From position 2 to position 3, the cutting element 17 continues to follow the contour of the cable, it being observed, however, that the cutting element projects only a very small distance into the cable, and not to an extent such that the conductors therein might be damaged. In moving from position 3 to position 4, the cutting element 17 travels through a limited distance following the contour of the cable, and then is retracted from the cable at a point spaced slightly behind the trailing edge of the next wound convolution.

In accordance with one aspect of the invention, the cutting element 17 has a square cutting face, and the clamping member 22 has cooperating cutting edges 27b, 28b along the lower edges of the recesses 27, 28. The element 17 and cutting edges 27b, 28b thus act as shearing dies, and, as the element moves through the cable casing, a small strip of material is removed therefrom and snapped off at the end, leaving an open slot in the cable, substantially as illustrated in Fig. 1. The die cutting action is advantageous in that sharp, jagged edges are avoided. Usually, though not necessarily, a small portion of the metal strip at the leading edge of the convolution remains intact, and the severance of the cable casing is completed by gripping the cable manually on opposite sides of the partially severed convolution, and bending the cable somewhat to break the uncut portion.

One of the outstanding features of the new cutting device resides in the fact that a section of B-X or similar cable may be gripped and severed in an improved manner and in a single and continuous closing movement of the handle of the device. This is a substantial improvement over prior cutting devices of which I am aware, in which separate manipulations or operations of the device are required to effect the cut and/or the cutting action is not entirely satisfactory. The improved operation of the new device is made possible by the use of a clamping member pivotally connected to and operating in conjunction with a handle member having cable gripping portions, the said handle member and clamping member being in turn pivotally connected to another handle member by a floating, cam controlled connecting arrangement. Thus, in a single, continuous closing movement of the handle members, the cable is first gripped, in the absence of any cutting action, and then a cutting element is projected into the cable casing and moved along the contour of a convolution thereof, in a direction substantially transversely of the convolution, to substantially sever the convolution without at any time cutting or damaging the electrical conductors within the cable.

An important practical advantage of the invention, in its illustrated form, resides in the compactness and overall simplicity of the device, enabling the device to be economically manufactured and conveniently utilized. The illustrated form of the device comprises three primary parts, which may be formed of stamped metal, which reduces the cost of manufacture, and the size and weight of the device, while at the same time providing adequate strength for the intended purpose.

It should be understood, however, that the specific form of the invention illustrated and described herein is intended to be representative only, as many changes may be made therein without departing from the clear teachings of the invention. Thus, the invention is thought to embody certain concepts of a broadly novel nature, particularly in respect of the operation of the device in effecting the clamping and cutting of a cable in an improved manner and in a continuous movement or manipulation of the device. Accordingly, reference should be made to the following appended claims in determining the full scope of the invention.

In the claims, and also in the specification, where reference is made to "clamping" or "gripping" a cable section in the jaws of the cutting device, no limitation is intended that the entire clamping or gripping action results from the action of the jaws alone. Thus, the gripping jaws, by themselves, may advantageously serve merely to position a cable section, the actual clamping or gripping of the cable resulting from cooperative action of the gripping jaws and the cutting element. The terms "clamping" or "gripping," then, are to be construed as meaning either clamping or gripping in the more ordinary sense or merely positioning of the cable for clamping or gripping in conjunction with the cutting element.

I claim:

1. A device for cutting B-X cable and the like, comprising a first handle member, said handle member having a portion at its forward end defining a recess for receiving a cable section, a cutting element mounted on said forward portion and projecting into said recess, means including a second handle member pivotally secured to said first handle member for gripping a cable section, and cam means acting between the first handle member and the gripping means whereby said cable section and cutting element are moved relative to each other in accordance with a predetermined pattern of movement upon pivotal movement of said handle members.

2. The device of claim 1, in which the gripping means includes a clamping member pivotally connected to said second handle member and forming therewith movable gripping jaws for receiving and clamping a cable section.

3. The device of claim 2, in which said second handle member and said clamping member are pivotally movable independently of each other in a direction tending to open said jaws upon movement of said second handle member in one direction, and said second handle member and said clamping members are movable in unison through a predetermined distance upon movement of said second handle member in the other direction.

4. The device of claim 1, in which the gripping means is pivotally connected to the forward portion of the first handle member by means of a pin carried by the gripping means and passing through a slot in said forward portion, said cam means comprises a second pin carried by said gripping means and passing through a second slot in said forward portion, said slots being disposed generally at an angle to each other, said second slot being contoured to cause the pivotal axis of said gripping means to shift transversely during pivotal movements of said gripping means.

5. The device of claim 1, in which the gripping means includes a clamping member carried by the forward portion of the first handle member, said clamping member being interconnected with said forward portion for pivotal movement about a shifting pivotal axis.

6. The device of claim 5, in which said clamping member has a generally U-shaped recess therein for receiving a section of cable, and said clamping member is adapted to grip and hold said section of cable at an acute angle with respect to said forward portion.

7. A device for cutting B-X cable and the like, comprising a first member having a portion defining a recess for receiving a cable section, a cutting element mounted on said portion and projecting into said recess, means including a second member for gripping said cable section, and means interconnecting said first and second members for pivotal movement about a pivotal axis which is movable with respect to said first member.

8. The device of claim 7, in which the first member is a first handle member, the second member is a clamping member having a recess therein for receiving said cable section, and a second handle member is pivotally connected to said clamping member and adapted upon pivoting movement with respect thereto to cause said cable section to be gripped by said clamping member, said second handle member and said clamping member being moveable in unison with respect to said portion through a predetermined distance to effect movement of said cable section with respect to said cutting element.

9. The device of claim 8, in which first spring means acts between said first and second members to urge said members to pivot relatively in a first direction, and second spring means acts on said second handle member to urge said second handle member and said clamping member to pivot relatively in one direction.

10. The device of claim 7, in which said second member is of U-shaped cross section and is received under and about said portion, the interconnecting means comprises separate elements connecting said first and second members at at least two spaced points, said elements permitting relative movement of said members in different directions.

11. The device of claim 10, in which said elements are pins carried by one of said members and received in slots in the other of said members.

12. The device of claim 11, in which one of said slots is of irregular contour.

13. The device of claim 10, in which said first member is a first handle member, and a second handle member is movably connected to said second member, said second handle member having portions adapted to grip said cable section and portions adapted to rigidly interconnect with said second member, said second handle member being adapted upon an initial relative movement toward said first handle member to effect clamping of said cable section in said second member and upon continued relative movement toward said first handle member to effect movement of said cable relative to said cutting element.

14. A device for cutting B-X cable and the like, comprising a pair of pivotally connected handle members, clamping means operated by said handle members for gripping a section of cable, cutting means operated by said handle members and effective upon pivotal movement of said handle members to cut into said cable section, means interconnecting said clamping means and said cutting means for pivotal movement about an axis which shifts relative to at least one of the said clamping or cutting means, and means cooperatively interconnecting said clamping and cutting means and said handle members whereby continuous movement of said handle members in one direction effects clamping and cutting of said cable in sequence, said clamping means being adapted to hold said cable section at an acute angle to the plane defined by said handle members, said cutting means comprising a cutting element movable in said plane relative to said cable section, said cutting element being adapted to move through and at least partially sever a convolution of a B-X cable along a line disposed generally transversely of said convolution.

15. The device of claim 14, in which said cutting element and clamping means are movable relatively in a predetermined irregular path whereby said cutting element substantially follows the contours of said convolution in effecting a severance thereof.

16. The device of claim 15, in which cam means interconnects said cutting element and clamping means for effecting relative movement between said element and means in said irregular path.

17. A device for cutting B-X cable and the like, comprising a pair of pivotally connected handle members, clamping means operated by said handle members for gripping a section of cable, and cutting means operated by said handles and effective upon pivotal movement of said handles to cut into said cable section, said clamping means and said cutting means being cooperatively interrelated whereby continuous movement of said handles in one direction effects clamping and cutting of said cable in sequence, said cutting means having at least four cutting edges and being adapted to remove a strip of material from said cable.

18. A device for cutting B-X cable and the like, comprising a first member having a portion defining a recess for receiving a cable section, a cutting element mounted on said portion and projecting into said recess, means including a second member for gripping said cable section, means interconnecting said first and second members for pivotable movement about an axis which is movable with respect to said first member, and means including a spring for urging said first and second members into a predetermined initial position wherein said cutting element is in position to engage a convolution of a B–X cable at one edge thereof.

References Cited in the file of this patent

UNITED STATES PATENTS

| | | |
|---|---|---|
| 1,670,250 | Froschhauser | May 15, 1928 |
| 2,364,801 | Martines | Dec. 12, 1944 |